United States Patent [19]

Haas et al.

[11] Patent Number: 4,844,912

[45] Date of Patent: Jul. 4, 1989

[54] PROCESS FOR THE PRE-ISOMERIZATION OF HOPS FOR PREPARING A BEER

[75] Inventors: Jean-Luc Haas, Paris; Beruard Deymie, Nancy; Pierre Millet, Saint Max; Michel Billon, Unieux, all of France

[73] Assignees: Electricite De France; Clextral, both of France

[21] Appl. No.: 148,833

[22] Filed: Jan. 27, 1988

[30] Foreign Application Priority Data

Jan. 27, 1987 [FR] France ............................... 87 00951

[51] Int. Cl.$^4$ ........................... C12C 3/02; C12C 9/02
[52] U.S. Cl. ...................................... 426/46; 426/600; 426/516
[58] Field of Search ............... 426/11, 16, 600, 655, 426/516; 435/93

[56] References Cited

U.S. PATENT DOCUMENTS 3,607,298  9/1971  Mitchell et al. ..................... 426/600
3,607,300  9/1971  Mitchell et al. ..................... 426/600
3,787,586  1/1974  Hokanson et al. .................. 426/600

FOREIGN PATENT DOCUMENTS 1204130  9/1970  United Kingdom .

Primary Examiner—Marianne Cintins
Attorney, Agent, or Firm—Sughrue, Mion, Zinn, Macpeak and Seas

[57] ABSTRACT

Process for the pre-isomerization of hops, in particular for preparing a beer or like beverage obtained from solely malt or from malt and at least one substitution cereal in a preparation line comprising an operation for obtaining a sugared wort and an operation for fermenting said wort in the presence of yeasts. The pre-isomerization is effected by cooking and extrusion of the hops at a temperature lower than 120° C. by a continuous passage of the hops, which are previously dried and pressed in a cooker-extruder having at least two screws, with a quantity of water less than 50% by weight, the extruded hops being then mixed with the sugared wort in the beverage-preparing line.

6 Claims, 4 Drawing Sheets

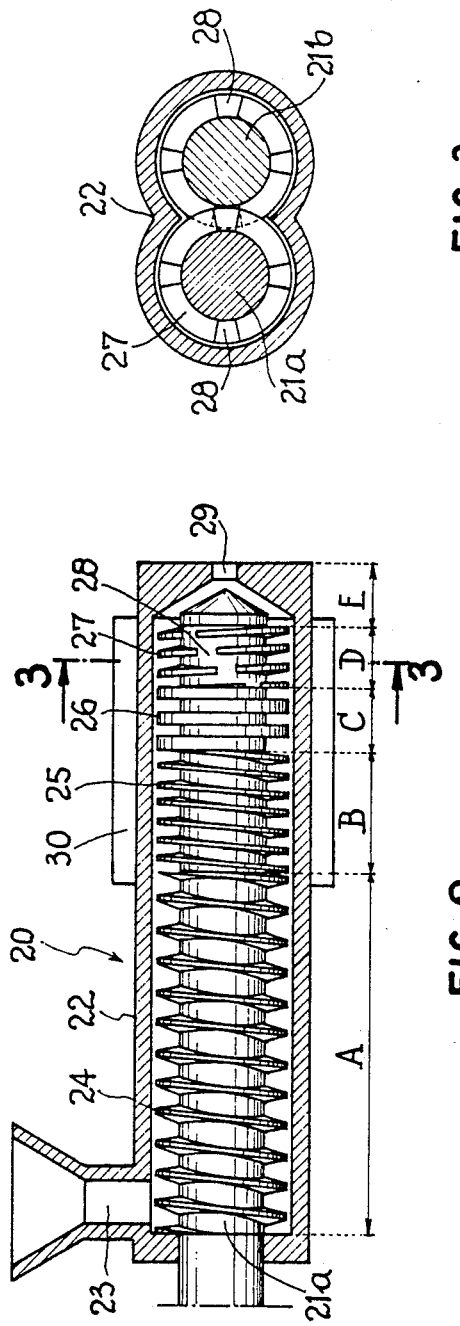

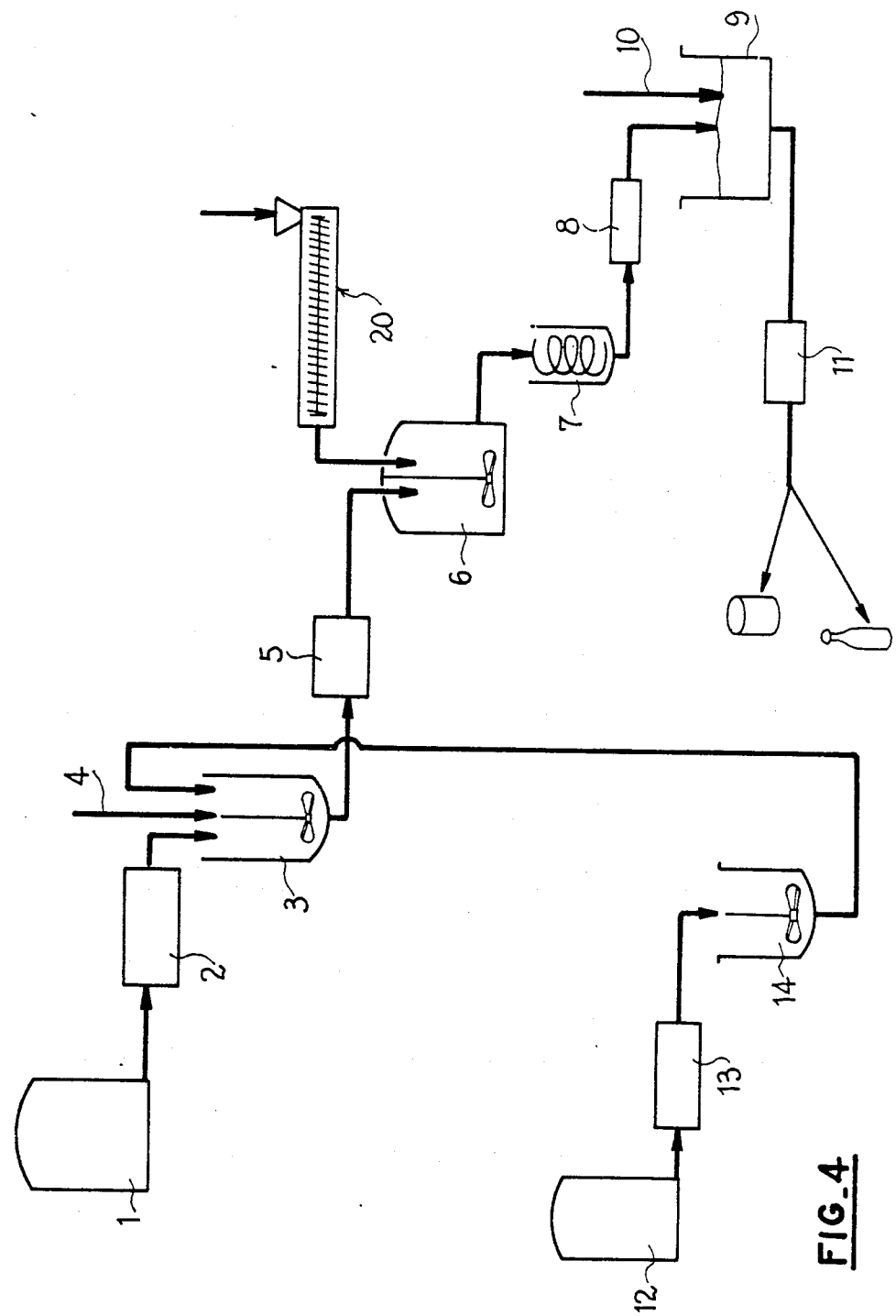
FIG_4

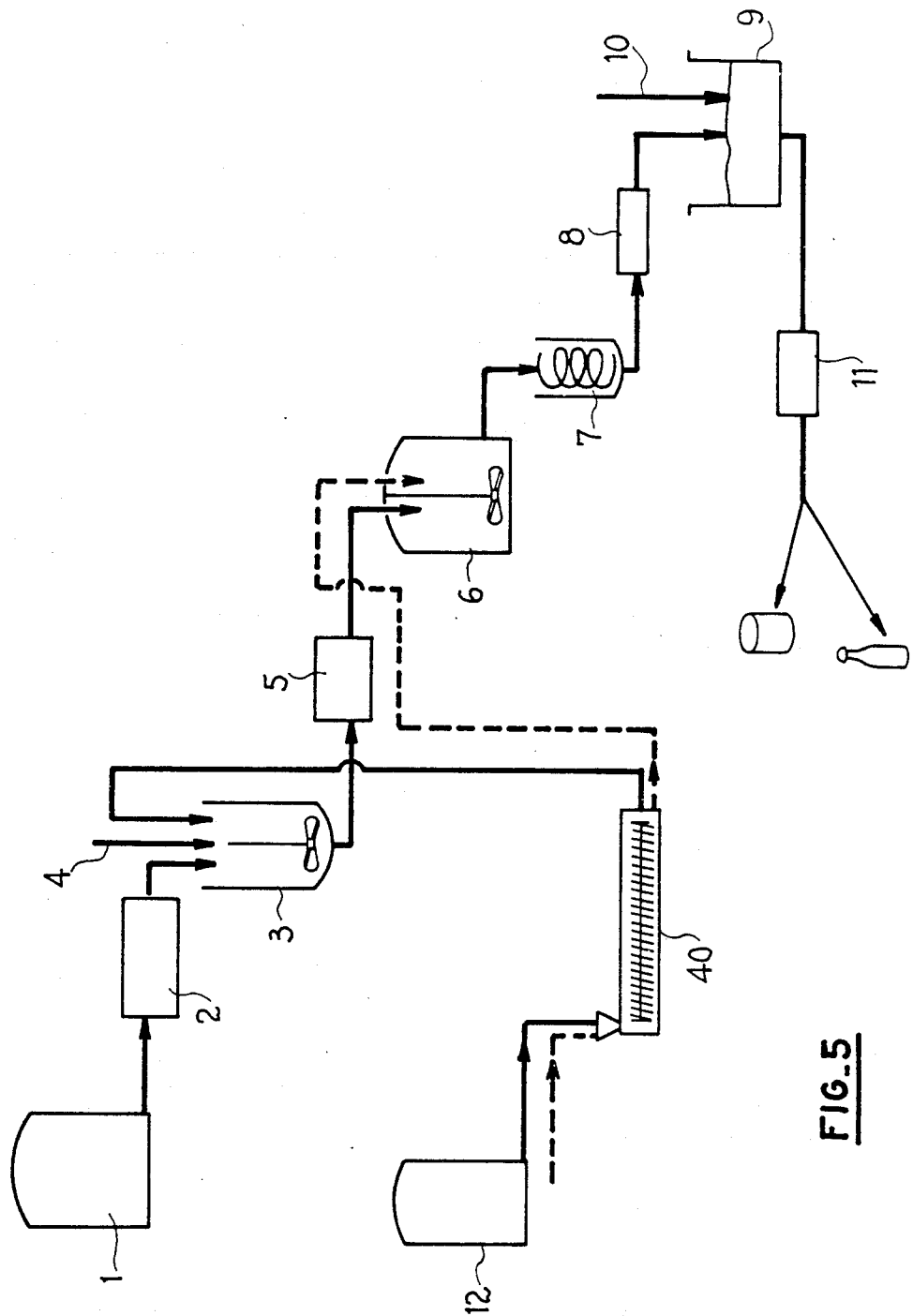
FIG._5

PROCESS FOR THE PRE-ISOMERIZATION OF HOPS FOR PREPARING A BEER

BACKGROUND OF THE INVENTION

The present invention relates to a process for the pre-isomerization of hops, in particular for preparing a beer or like beverage.

It is known that beer is usually prepared from malt, i.e., germinated barley, from which a sugared wort is prepared in a treatment termed brewing, this wort being then subjected, after cooling, to a fermentation in the presence of yeast to obtain an alcoholized beverage. The malt is first of all crushed in a mill and the flour obtained is mixed with water in a hydrator for the pasting operation. The solution obtained is then conveyed to a material vat in which the saccharification of the starch occurs.

The sugared wort thus obtained is then subjected to the successive operations of filtration, cooking and hopping.

The hops are therefore a traditional additive in brewery which, when added to the sugared wort, imparts to the beer in particular its gustative and thirst-quenching qualities by its bittering power.

Now, in order to be effective, the hops must undergo before use an isomerization of its active principles. These conditions of isomerization of its active principles and exhaustion of the hops in a conventional brewing hall adapted to produce brewer's wort are particularly bad.

Indeed, the low pH of the wort, the absorbent power of the cloudy part, among other factors, limit the transformation of this raw material and gives a particularly poor hopping yield, on the order of 20 to 30%, this yield being the higher as the hopping is low. Furthermore, the chemistry of the hops is excessively complex and among the parts of the hops of use in brewery there are principally the essential oils, resins, waxes, lipids and tannins.

The essential oils are formed by a fraction of lupulin which is distillable with steam, non-miscible with water and is a complex mixture of hydrocarbons and oxygenated compounds.

The resins and the essential oils perform in the beer an aromatizing function and two acids are found in the resins which impart to the hops its bittering power and antiseptic power, namely humulon and lupulon.

In the course of the treatment of the hops, it is necessary to take into account the fact that the essential oils are volatile, i.e., the hops must not be allowed to cook for an excessively long period.

As concerns the bitter resins, they on the contrary require a rather long boiling, on the order of one hour, so as to be solubilized in a stable manner after polymerization.

Further, the boiling also increases the colouring of the beer; this is due partly to the conversion of the sugars into caramel and partly to the oxidation of the tannin of the hops.

Moreover, the hops is an expensive raw material and it is advisable to use it under optimum exhausting conditions.

This is why at the present time a certain number of methods have been developed for pre-transforming the hops before it is used in brewing, for the purpose of improving the yield. These methods employ chemical artifices which are not authorized by every beer-producing country.

Up to the present time, the techniques of isomerization employed the conversion of an alkali solution. But the alkali and the temperature bring about a change in the composition of the hops. This isomerization has a yield of at the most 80% since a proportion of the iso-alpha acids is hydrolized into non-bitter humulinic acids. One of the problems with isomerized hops is their stability, since the isomerization is sensitive to variations in temperature, pH and the composition of the medium.

The addition of isomerized extracts of hops to the filtered beer is generally not practiced in a commercial way, since, when added in this way, they have a tendency to render the beer more cloudy. However, it is obvious that the later this hops are added in the beer-preparing process, the higher the yield.

Generally, the isomerized hops are diluted in water and, as a certain time is required to allow them to become diluted in the beer, this product is added at the beginning of the keeping period and not at the end. In order to promote this dilution, the isomerized hops are added to the beer in a turbulent state, i.e., in a pipe or pump. The major part of the losses of hops occurs in fermentation and it is therefore preferable to add the isomerized extracts with their alkaline salt after the fermentation, namely just before or just after the filtration.

But the main defect of the beer employing this kind of hops is the exaggerated frothing.

SUMMARY OF THE INVENTION

In order to remedy the aforementioned drawbacks, an object of the present invention is to provide a process for the pre-isomerization of the active principles of the hops which permits a significant improvement in the yield of the hopping while providing a product of quality.

The invention therefore provides a process for the pre-isomerization of hops, in particular for the preparation of a beer or like beverage obtained solely from malt or from malt and at least one substitution cereal in a pre-preparation line comprising an operation for obtaining a sugared wort and an operation for the fermentation of said wort in the presence of yeasts, wherein the pre-isomerization is carried out by a cooking and extrusion of the hops at a temperature lower than 120° C. by a continuous passage of said previously-dried and pressed hops in a cooker-extruder having at least two screws, with a quantity of water less than 50% by weight, the extruded hops being then mixed with the sugared wort in the beverage-preparing line.

According to another feature of the invention, the quantity of water introduced with the hops in the cooker-extruder is between 35 and 50% by weight and the water has a pH of between 7 and 9.

According to yet another feature of the invention, the quantity of water introduced with the hops in the cooker-extruder is between 20 and 35% by weight and the water has a pH of between 9 and 11.

A better understanding of the invention will be had from the following description which is given solely by way of example, with reference to the accompanying drawings, in which:

BRIEF DESCRIPTION OF THE DRAWINGS

FIG. 2 is an axial sectional view of the cooker-extruder for carrying out the process according to the invention;

FIG. 3 is a sectional view taken online 3—3 of FIG. 2;

FIG. 4 is an assembly diagram of a semi-traditional plant for preparing beer comprising a cooker-extruder for the pre-isomerization of the hops according to the invention, and FIG. 5 is an assembly diagram of a modification of the semi-traditional plant of FIG. 4.

DETAILED DESCRIPTION OF PREFERRED EMBODIMENTS

Figure 1:
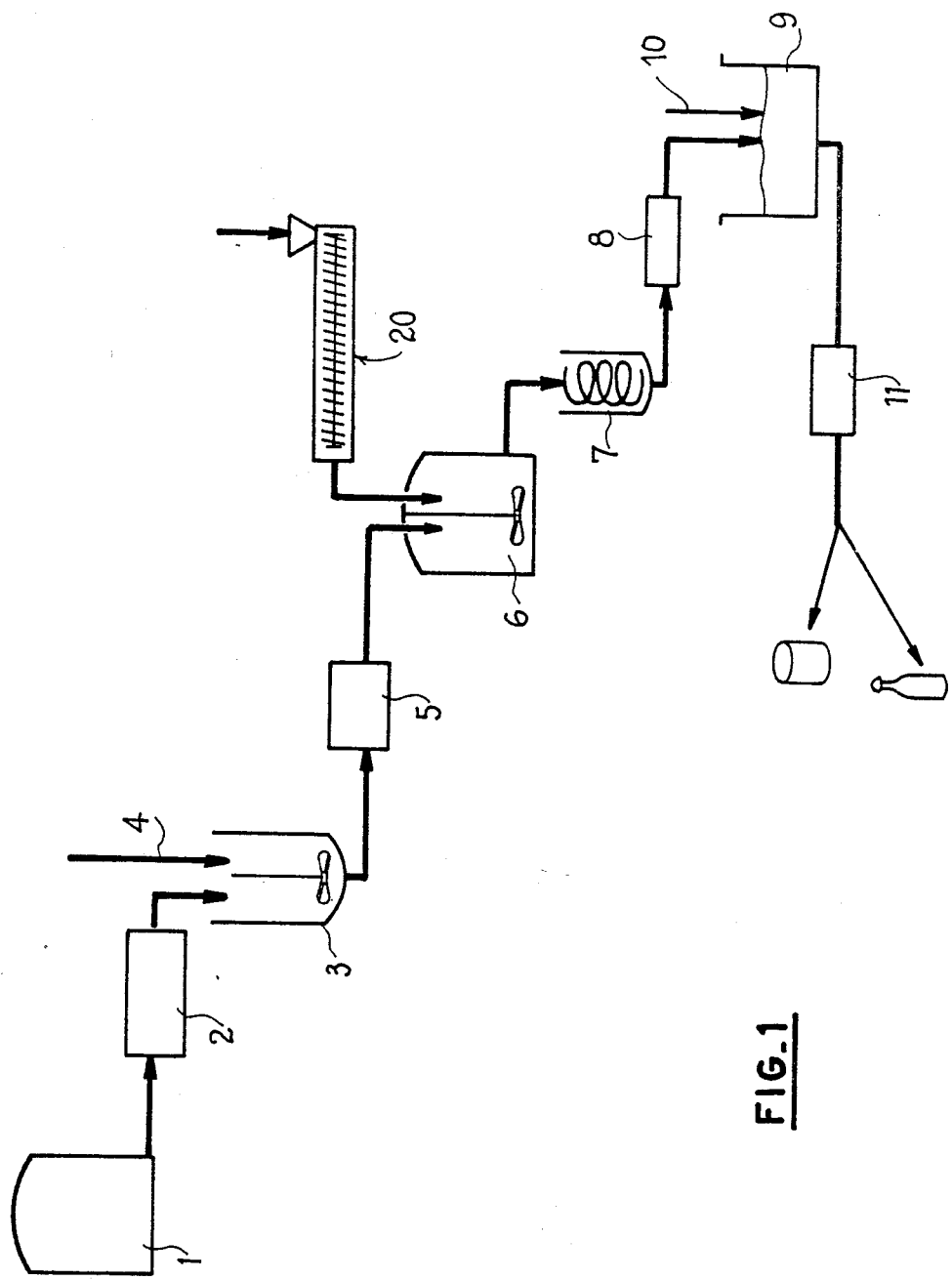
FIG. 1 is an assembly diagram of a traditional plant for preparing beer and comprising a cooker-extruder for the pre-isomerization of the hops according to the invention.

FIG. 1 shows diagrammatically the assembly of a traditional plant for preparing beer from solely malt.

The preparation line comprises, following on a malt storage silo 1, a crusher 2 and a pre-mashing apparatus 3, also termed a hydrator, in which a paste is formed by the mixture of malt flour with a pre-determined quantity of water 4. The paste prepared in this way then passes into a filter 5 and sent to a saccharification device 6 consisting of a vessel termed wort boiler. In this wort boiler, the paste is subjected to a brewing and heat is applied in stages in order to carry out the various steps of the saccharification treatment under good conditions.

Furthermore, there is added in the wort boiler 6, at the same time as the previously-prepared paste, the hops pre-isomerized in accordance with the process of the invention in a cooker-extruder 20 which will be described hereinafter.

Thereafter, the wort, after being cooked and mixed with the extruded hops, passes into a separator 7 and then into a cooling device 8 before being introduced into a fermentation vat 9 for obtaining an alcoholized beverage. Indeed, it is in the course of the fermentation, under the influence of yeasts 10 introduced into the fermentation vat 9, that the alcohol appears, resulting as it does from the transformation of the fermentatable sugars contained in the cooled wort.

At the outlet of the fermentation vat 9, the beer prepared in this way passes through a filter 11 so as to eliminate the cloudy part and then the beer is placed in barrels or bottles.

As mentioned before, the hops are, before they are introduction into the wort boiler 6, pre-isomerized in a cooker-extruder 20 shown in more detail in FIGS. 2 and 3.

The cooker-extruder 20 comprises two screws 21a and 22b driven in rotation about their axes within an elongated enclosure forming a barrel 22 surrounding the screws. The barrel is provided with an orifice 23 at one of its ends in its upper part and is open at its other end so that the material introduced at the upstream end through the orifice 21 and entrained by the rotation of the screws can be discharged from the downstream end.

The screws 21a and 21b are provided with flights or other peripheral elements which intermesh and the inner wall of the barrel 23 forms two intersecting cylindrical lobes whose inside diameter is slightly larger than the outside diameter of the flights or peripheral elements. These flights are in imbricating relation to one another and, in the illustrated example, the two screws 21a and 21b are driven in rotation in the same direction so that the flights are identical and merely offset from one another.

The screws 21a and 21b are advantageously formed by splined shafts on which screw sections are stacked, these sections being formed by sleeves whose inner part is provided with splines corresponding to those of the shaft and whose outer part is provided with flights having varied pitches or other peripheral treating and conveying elements. A rather large number of sections may be made available so that it is possible to vary the pitch, the depth and the number of flights and the length of each region of the screw.

The cooker-extruder 20 is therefore constituted by a plurality of successive regions, each corresponding to a particular function.

Thus, there is a region A for driving the material in the downstream direction, then a region B for progressively compressing, then a kneading region C, a shearing and counter-pressure region D, and, lastly, a region E for discharging the treated material.

In the first region A, the screws 21a and 21b are provided with flights 24 having a direct pitch which convey the material introduced through the orifice 23.

In the second region B for effecting a progressive compression, the screws 21a and 21b are provided with flights having a narrower pitch.

The region B is followed by a kneading region C formed by kneading disks 26, namely juxtaposed circular disks whose centres are angularly offset in such manner as to follow a turning helical line around the axis of the screw.

In the region C, the screws 21a and 21b are provided with flights 25 of reversed pitch in which openings 28 (FIG. 3) are formed which extend radially from the shaft of each screw to the periphery of the flight and are moreover evenly spaced apart around the axis. The screws 21a and 21b are keyed in such manner that two openings 28 periodically come into coincidence in the central conveying region. In this way, a control is exerted over the passage of the controlled flow of material in the downstream direction, which results in a retarding action in this region and consequently a compression on the upstream side so that the laminating effects are increased.

The discharging region E comprises at least one extruder die 29 placed at the downstream end of the barrel 22.

Placed along the barrel 22 are means for heating and regulating the treated material which extends in the regions B, C and D.

The previously-dried and pressed hops are introduced through the orifice 23 at the upstream end of the cooker-extruder with a pre-determined quantity of water and at a pre-determined pH.

In the conveying region A, the hops are mixed with the water and thus form a paste which is gradually compressed in the region B having the narrower pitch. The flights are gradually filled and drive the paste in rotation on their periphery, this paste passing from one flight to the other in the intermeshing region of the screws 21a and 22b in which the narrowing of the section of the passage results in an increase in the pressure and in an increased shearing effect. The temperature of the treated material increases under the frictional effect and optionally from the heating of the barrel 22 by heating means 30.

Thereafter, the paste passes into the kneading region C formed by the kneading disks 26. Consequently, the paste passes through a helically-turning space and it is crushed at the same time against the inner walls of the barrel 22, which promotes the kneading and lamination effects.

The material then forming a viscous paste passes into the region D provided with flights 27 of reversed pitch in which openings 28 are provided. A part of the paste compressed inside the flight can pass into the following flight through the axial orifice thus formed which periodically opens. Within the region D, the paste is therefore subjected to an intense kneading by the combined effects of compression and shearing and this region results in a retarding action and consequently a compression on the upstream side which consequently increases the laminating effects. Furthermore, under the effect of friction and heating means 30 which enable the temperature of the treated material to be regulated, the material can be maintained between 100° and 120° C., and preferably between 105° and 115° C., until it leaves the region D. This procedure homogenizes the mixture by the successive passage through the various regions and by the extrusion in the die 29 which produces an additional laminating effect.

There is consequentLy obtained at the outlet of the cooker-extruder a product which is ready to be introduced into the wort boiler 6 at the same time as the paste obtained from the malt.

A pre-isomerization of the hops is thus achieved by physical means in a cooker-extruder, and it appears that four essential factors have an influence on the isomerization yield.

These four factors are the temperature of the material, which is advantageously as high as possible with a limit of 120° C. at which occurs the beginning of a denaturation of the product, the quantity of water associated with the hops during the extrusion, the mechanical action provided by the composition of the screws of the cooker-extruder, and lastly, the pH of the water.

Indeed, an optimum yield of hopping is obtained between 60 and 80% with a quantity of water of 20 to 35% by weight having a pH of 9 to 11, or with a quantity of water of 35 to 50% by weight and a pH of 7 to 9, the temperature of the material being between 100° and 120° C. and preferably between 105° and 115° C.

The semi-traditional plant shown in FIG. 4 also comprises a line for preparing sugared wort from malt, then a fermentation stage, and, lastly, a stage for conditioning the beer. The pre-isomerization of the hops is also carried out in a cooker-extruder and the isomeriztion parameters are the same.

But this plant has the feature of employing in association malt and a substitution product termed raw grain.

For this purpose, the plant comprises, in parallel with the malt-preparing line (1, 2, 3), a line for preparing substitution cereal, for example broken rice. This line comprises a storage silo 12, a crusher 13 and a heating boiler 14 formed by a vat provided with a stirrer. Before being subjected to the action of the malt, the raw grain is cooked to a moderate temperature in the boiler 14 with water to achieve the thickening of the starch contained in the cereal. The starch gelatinized by boiling in the water is then subjected to the action of the enzymes of the malt in the mashing device 3.

This process therefore permits, insofar as legislation so allows, replacing a part of the malt by a substitution cereal, which constitutes an economy.

The plant shown in FIG. 5 also comprises a sugared wort-preparing line formed by the crusher 2, the pre-mashing apparatus 3 and a saccharification device 6, then a fermentation stage 9 and a beer-conditioning stage.

This plant comprises a substitution cereal-preparing line in parallel with the malt-preparing line. But in this case, the crusher and the soaking boiler 14 are replaced by a cooker-extruder 40. The use of this cooker-extruder in the substitution cereal-preparing line permits reducing the percentage of malt and increasing the percentage of the substitution cereal to 80%.

Moreover, the cooker-extruder 40 is employed alternatively for pre-isomerizing the hops according to the previously-described process. This arrangement has the advantage of making it possible to eliminate the soaking boiler and rapidly priming the cooker-extruder.

In the foregoing embodiments, the extruded hops are introduced, in the beer-preparing line, in the region of the charging of the wort boiler, but it is also possible to introduce them just before fermentation in the still-hot wort before cooling or before final filtration.

Generally, the process for pre-isomerizing the hops according to the invention results in a hopping yield which is distinctly higher than that possible with the process employed heretofore, which represents a significant economic advantage while producing a product comparable to that obtained by conventional hopping, in particular from the organoleptic point of view and independently of the bitterness.

What is claimed is:

1. In a process for the pre-isomerization of hops for the preparation of a beer obtained from malt alone or from malt and at least one substitution cereal in a beer-preparing production line in which a sugared wort is prepared and fermented in the presence of yeasts, the improvement wherein the pre-isomerization is effected by first drying and pressing the hops and, then, by cooking and extruding the hops at a temperature lower than 120° C. by continuously passing the previously dried and pressed hops through a cooker extruder, having at least two screws, with a quantity of water less than 50% by weight, then mixing the extruded hops with the sugared wort in a beer-preparing production line.

2. A process according to claim 1, wherein the temperature of cooking and extruding of the hops is between 100° and 120° C.

3. A process according to claim 2, wherein said temperature is between 105° and 115° C.

4. A process according to claim 1, wherein the quantity of water introduced with the hops into the cooker-extruder is between 35 and 50% by weight and the water has a pH of between 7 and 9.

5. A process according to claim 1, wherein the quantity of water introduced with the hops in the cooker-extruder is between 20 and 35% by weight and the water has a pH of between 9 and 11.

6. A process according to claim 1, comprising effecting the isomerization of the hops in the cooker-extruder alternating with a substitution cereal-thickening process.

* * * * *